United States Patent [19]
Hall

[11] Patent Number: 5,282,083
[45] Date of Patent: Jan. 25, 1994

[54] AFOCAL LENS SYSTEM

[75] Inventor: John M. Hall, Alexandria, Va.

[73] Assignee: The United States of America as represented by the Secretary of the Army, Washington, D.C.

[21] Appl. No.: 860,967

[22] Filed: Mar. 31, 1992

[51] Int. Cl.$^5$ .......................... G02B 13/14; G02B 9/64
[52] U.S. Cl. ...................................... 359/357; 359/755
[58] Field of Search ............... 359/355, 356, 357, 708, 359/755

[56] References Cited

U.S. PATENT DOCUMENTS

| | | | |
|---|---|---|---|
| 3,947,084 | 3/1976 | Noyes | 359/354 |
| 4,397,520 | 8/1983 | Neil | 359/357 |
| 4,427,259 | 1/1984 | Fjeldsted | 359/357 |
| 4,542,954 | 9/1985 | Stoltzmann | 359/357 |
| 4,558,222 | 12/1985 | Neil | 359/357 |
| 4,802,717 | 2/1989 | Kebo | 359/354 |

OTHER PUBLICATIONS

J. M. Lloyd; "Thermal Imaging Systems"; May 1975; pp. 430–439.

Primary Examiner—Bruce Y. Arnold
Assistant Examiner—Darryl Collins
Attorney, Agent, or Firm—Milton Lee; Alain L. Bashore

[57] ABSTRACT

An afocal lens assembly which includes a first and second lens group used for testing an infrared detector assembly. The first lens group includes three lens elements and the second lens group includes four lens elements. The output of the lens assembly includes up to a 60 degree collimated field-of-view. The lens elements are infrared transmissive.

11 Claims, 3 Drawing Sheets

AFOCAL LENS SYSTEM

BACKGROUND OF THE INVENTION

1. Field of the Invention

The field of the invention disclosed herein is directed to afocal lens assemblies, and more specifically to afocal lens assemblies used with a collimator having up to a 15 degree field-of-view output for testing an infrared detector assembly.

2. Description of Related Prior Art

In the prior art, thermal imaging systems were developed to overcome distinct disadvantages of other detection methods such as radar or visible optics. These other methods generally operate in an "active" mode in which electromagnetic radiation is emitted and a sensor detects that return signature but allows for detection and countermeasures to render such systems ineffective. Also such active systems are limited due to such performance characteristics as range and day/night operation. First generation Forward Looking Infrared (FLIR) sensors were developed to extend vision beyond the visible light spectrum and are capable of "passive" operation. Such systems allow for superb action since most objects radiate in the IR region. The testing of such systems typically employs collimating optics (usually mirrors) which provide a plane-wave input, and a detector which is positioned in the focal plane of the test system. A more thorough description of system performance testing for first generation FLIRs may be found in Chapter 11 of "Thermal Imaging Systems" by J. M. Lloyd.

Deficiencies in the first generation FLIRs have led to the development of a second generation of FLIRs. First generation FLIRs included deficiencies such as cryogenic cooling and scanning. The second generation of FLIRs were developed to include some of the following characteristics:

1. detector material responsive to ambient temp;
2. the elimination or minimization of cooling "noise";
3. more efficient cooling technique;
4. staring focal plane arrays which eliminate scanning;
5. simplified power supply
6. up to a 60 degree field-of-view.

With the development of second generation FLIRs there is now a need to measure and test the performance of these systems.

SUMMARY OF THE INVENTION

The invention disclosed herein is directed to an afocal lens assembly used with a collimator having up to a 15 degree field-of-view output for testing an infrared detector assembly. The assembly includes a first and second lens group. The first lens group which includes three lens elements focuses incoming collimated light. A second lens group accepts the focused light and collimates a lens assembly output which is extended up to a 60 degree field-of-view. The lens groups are infrared transmissive and the assembly output performance includes an on-axis Modulation Transfer Function of 50% at 3 cycles per milliradian.

The primary objective of this invention is to provide an afocal lens assembly to allow for the testing and measurement of thermal viewers.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
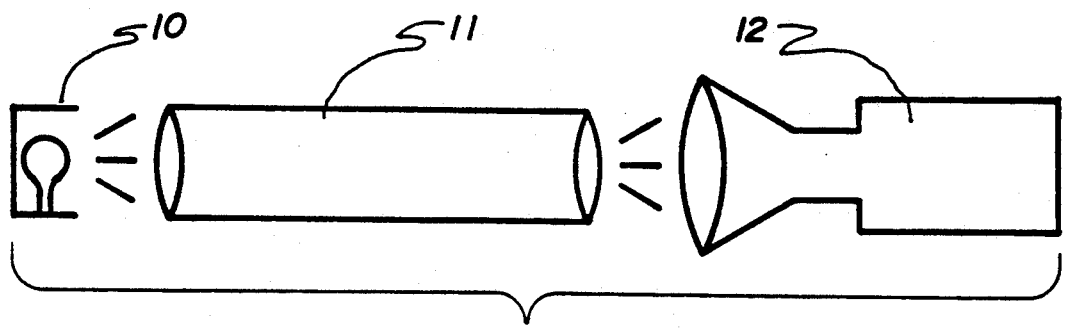
FIG. 1 is a pictorial side view of the simplified test scheme utilizing the lens assembly.

The afocal lens assembly of the present invention is preferably utilized in the simplified test system shown in FIG. 1. In FIG. 1 there is shown an infrared collimator 10 which outputs infrared collimated light with an output field-of-view (FOV) of 15 degrees. That output is received as input to a magnifying telescope 11 which contains the afocal lens assembly of the present invention. Magnifying telescope 11 will output via the afocal lens assembly of the present invention a FOV of 60 degrees. Sensor 12 is a second generation Forward Looking Infrared (2nd Gen FLIR) camera sensor which has an input FOV of 60 degrees. Collimator 10, telescope 11, and sensor 12 are all in the same focal plane of the test system. It is understood that the measurement to be taken by use of the lens assembly of the present invention may be a system level measurement or an optical component measurement.

It is also understood that the invention is not limited to a specific collimator or sensor but may be any type of infrared collimator with a FOV of up to 15 degrees and infrared sensor with a FOV of up to 60 degrees.

Figure 2:
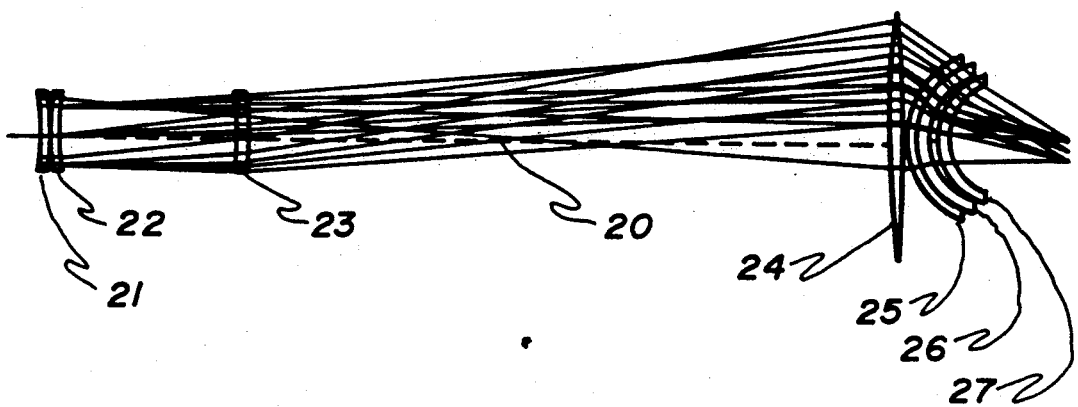
FIG. 2 is a side view of the lens assembly superimposed on an optical ray-trace diagram.

FIG. 2 depicts the lens assembly of the present invention. A first and second lens group is shown positioned along a common focal axis 20. The first lens group comprises of three lens elements 21, 22, and 23 which focus incoming collimated light. The second lens group comprises four lens elements 24, 25, 26 and 27 which accepts the focused light and collimates a lens assembly output. Each lens element is described in Table 1 below where all dimensions are given in inches and a positive and negative radius indicates the center of curvature in to the right and left respectively according to what is shown in FIG. 2.

TABLE 1

| ELEMENT NUMBER | RADIUS OF CURVATURE | | THICKNESS | APERATURE DIAMETER | | GLASS |
| --- | --- | --- | --- | --- | --- | --- |
| | FRONT | BACK | | FRONT | BACK | |
| OBJECT | | INF | INFINITY | 3.0018 | | |
| | | | 0.0050 | | | |
| | | | | | 3.0018 | |
| | | | 0.0000 | | | |
| 21 | A(1) | −9.4789 CX | 0.5044 | 3.0018 | 3.1199 | GERMLW |
| | | | 0.0050 | | | |
| 22 | 9.4817 CX | 9.0051 CC | 0.5012 | 3.1107 | 3.0189 | ZNSE |

TABLE 1-continued

| ELEMENT NUMBER | RADIUS OF CURVATURE | | THICKNESS | APERATURE DIAMETER | | GLASS |
|---|---|---|---|---|---|---|
| | FRONT | BACK | | FRONT | BACK | |
| 23 | −7.4609 CC | −7.3264 CX | 7.0880 0.5115 14.3043 | 4.0070 | 4.2318 5.7346 | GERMLW |
| | | | 9.0704 | | 6.6671 | |
| 24 | A(1) | −106.9158 CX | 11.0853 0.7317 0.0050 | 9.5539 | 9.5239 | GERMLW |
| 25 | 3.8791 CX | 3.2738 CC | 0.4981 0.0050 | 7.1012 | 6.1808 | ZNSE |
| 26 | 3.1578 CX | 2.7553 CC | 0.4969 0.3467 | 6.0976 | 5.3563 | ZNSE |
| 27 | 2.8454 CX | A(3) | 0.4973 5.0000 | 5.3270 | 4.6651 | GERMLW |
| | | APERTURE STOP | 1.50000 | | 0.7486 | |
| IMAGE | IMAGE DISTANCE = NF | | 3.000 | | 2.4581 3.1597 | |

Each lens element is described in terms of a radius of curvature for front and back of each lens where CC denotes concave and CX denotes convex. The values A(1), A(2), A(3), denote aspheric surfaces which are described in terms of the constants listed in Table 2 below:

TABLE 2

| ASPHERIC | CURV | K | A | B | C | D |
|---|---|---|---|---|---|---|
| A(1) | −0.10448640 | 10.649340 | 1.46156E-03 | 9.76460E-05 | 1.21621E-05 | 2.70689E-07 |
| A(2) | 0.04839538 | 0.000000 | −4.74179E-04 | 1.86815E-05 | −4.75946E-07 | 4.17332E-09 |
| A(3) | 0.41878728 | −0.165358 | −1.18140E-03 | 1.33017E-04 | 5.96033E-06 | 1.03506E-07 | which were derived using the following equation:

$$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

Referring again to Table 1, the lens assembly also is described in terms of thickness defined as axial distance to the next surface. Thickness between lens elements denote air gaps. Front and back aperture diameters are also disclosed for each lens element with equivalent diameters shown for air gaps. Image diameter shown in Table 1 is a paraxial value, not a ray traced value. The reference wavelength of the above values is 10 microns for the spectral region of 8 to 12 microns. Entrance and Exit pupil dimensions and overall length (OAL) are given below:

| | | |
|---|---|---|
| ENTR PUPIL DIAMETER | = | 3.0000 |
| DISTANCE | = | −0.5674 |
| EXIT PUPIL DIAMETER | = | 1.5000 |
| DISTANCE | = | −3.0000 |
| OAL | = | 52.1558 |

The lens elements are made of infrared transmissive materials with minimal vignetting across entire FOV. Along with a low infrared absorbance, these materials should also have ideally a zero coefficient of thermal expansion, high surface hardness and high mechanical strength. The lens materials used are Germanium and Zinc Selenide and are indicated in Table 1. It is understood that the invention is not limited in the preferred materials indicated above but may utilize equivalent materials which also include the above properties.

Figure 3:
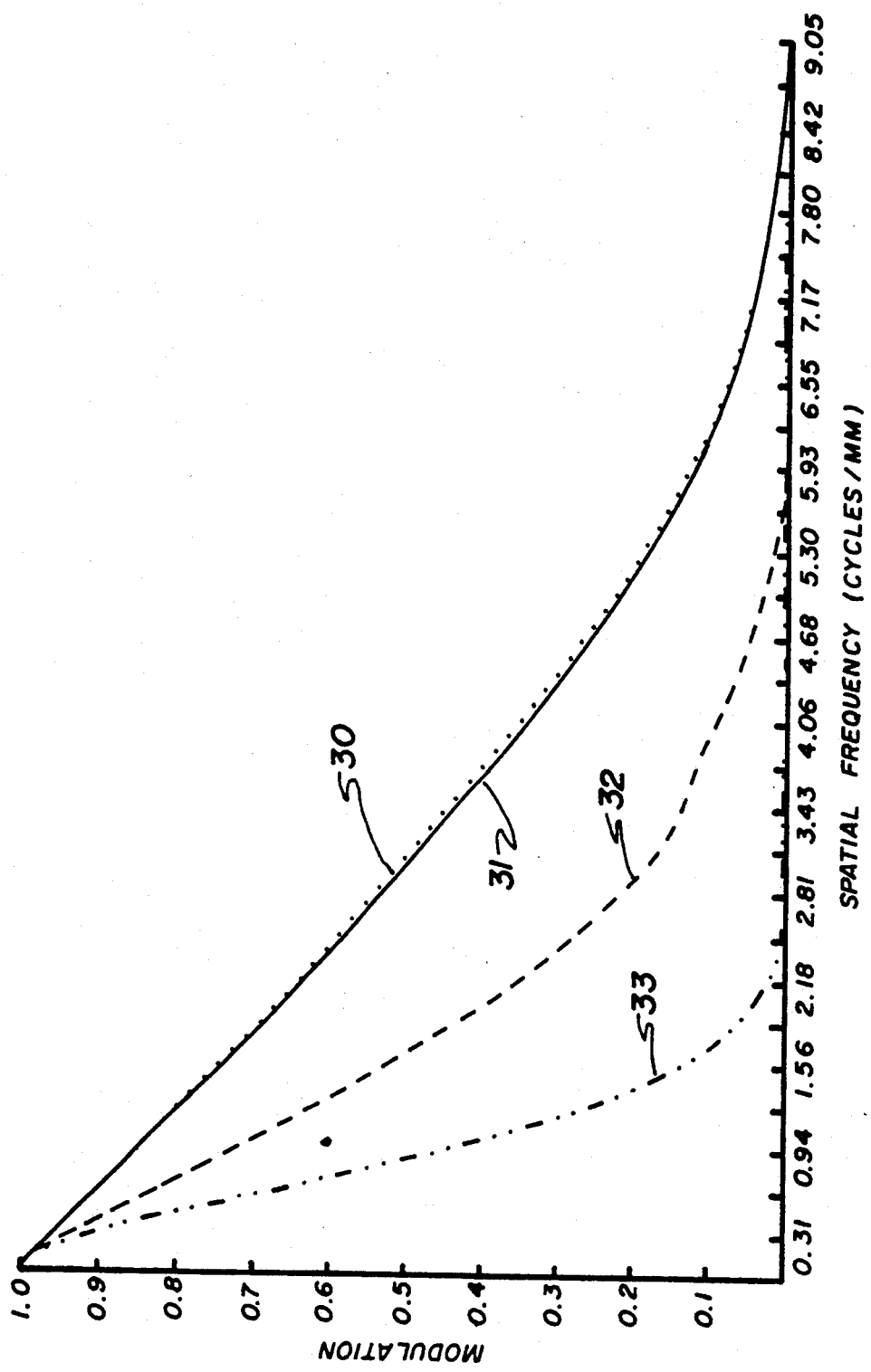
FIG. 3 is a graphical representation of MTF performance of the lens assembly.
Figure 5:
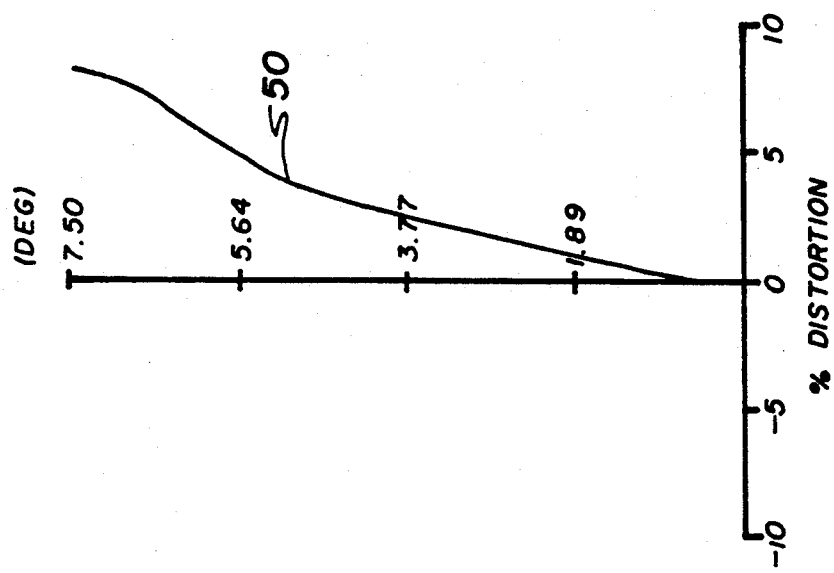
FIG. 5 is a graphical representation of distortion performance of the lens assembly.
Figure 4:
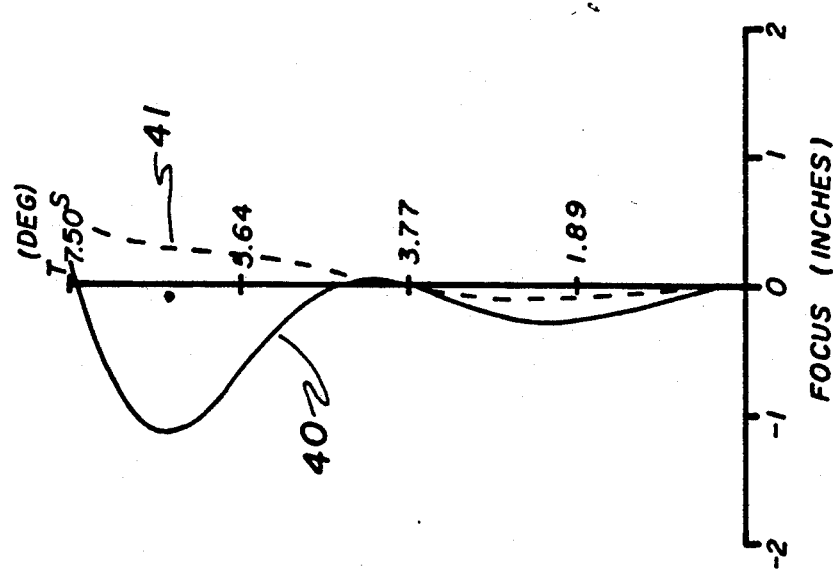
FIG. 4 is a graphical representation of field curvature performance of the lens assembly.

Operational performance of the lens assembly of the present invention will next be disclosed with reference to FIGS. 3, 4, and 5.

FIG. 3 discloses the diffraction Modulation Transfer Function (MTF) performance of the lens assembly. One of the primary performance measurements of an optical system is its resolution, represented as the on-axis and off-axis MTF. In FIG. 3, line 30 is the diffraction limit and line 31 is the on-axis (0° FOV) MTF. Line 32 is the tangential component of the off-axis (7.5 degree FOV) MTF and line 33 is the saggital component of the off-axis (7.5 degree FOV) MTF. As shown in FIG. 3, the afocal lens assembly is a nearly diffraction limited MTF response of 50% at 3 cy/mrad.

FIG. 4 discloses a field curvature plot in the lens assembly. A sharp focus is desired in an optical system but especially in complex optical system there is a problem with astigmatism which gives rise to blurred images at the margins. Line 40 is the tangential astigmatic field curve while line 41 is the saggital component of the astimatic field curve. As shown in FIG. 4, astigmatism does approach a "greater than minimum" out of focus range beyond +/− 3.77 degrees FOV.

FIG. 5 discloses a distortion plot for the lens assembly performance. An approximately uniform lateral magnification over its entire FOV is required, and is measured in terms of distortion. Types of distortion include pin cushion and barrel distortion. Line 50 is the percent distortion for the lens assembly performance. As seen in FIG. 5, distortion does approach a "greater than minimal" 10% at +/− 7.5 degrees FOV.

Any thermal imaging system which uses a lens assembly may exhibit image defects which result from internal retroreflection of cold surfaces onto the sensor. The phenomenon called the narcissus effect occurs when a sensor detects its own cold surface relative to its warm surroundings. Table 3 shows the parameters for the narcissus analysis of the lens assembly which resulted in "minimal" Narcissus effects with a 1.30208 Narcissus Intensity Ratio with a reflectivity per surface of 0.010 and a Narcissus induced temperature difference of 0.772 degrees C.

TABLE 3

| | TEMPERATURE | | INTEGRATED BLACK-BODY RADIANT EMITTANCE | DIFFERENTIAL RADIANT EMITTANCE |
|---|---|---|---|---|
| | Deg. C. | (Deg. K.) | mW/cm2 | Mw/cm2/deg C. |
| DETECTOR: | −195.9 | (77.3) | 0.000 | |
| HOUSING: | 20.0 | (293.2) | 8.992 | |
| SCENE BACKGROUND: | 20.0 | (293.2) | | 0.1517 |
| COLD STOP SURFACE: | | | 20 | |
| COLD STOP DIAMETER: | | | 2.4581 IN | |
| SCENE FULL ANGULAR SUBTENSE: (from detector) | | | 0.07478 Radians | |

The lens assembly of the present invention of which the design is disclosed herein therefore has the following performance characteristics:
  Max 15 degree Input and max 60 degree Output FOV
  Overall length <53"
  8-12 um Wavelength Band
  5"Flange Relief from last element to exit pupil
  "Minimal" Distortion and Narcissus
  Nearly Diffraction Limited MTF Response of 50% @ 3 cy/mrad
  Minimal Vignetting across entire FOV
  3" Entrance diameter
  Transmission >75%

These performance characteristics allows for the testing and evaluation of second generation FLIR sensors.

Industrial applicability of this invention includes but is not limited to: military, optics, photographic and IR technology.

This preferred embodiment is not intended to restrict the invention to the precise embodiment or embodiments described.

I claim:

1. An afocal lens assembly used with a collimator having up to a 15 degree field-of-view output, for testing an infrared detector assembly comprising:
  a first lens group positioned on the focal axis which focuses incoming collimated light having a field-of-view of 15 degrees or less;
  a second lens group positioned after said first lens group on said focal axis which accepts said focused light and collimates it to thereby form a lens assembly output magnified up to a 60 degree output field-of-view for a 15 degree input field-of-view, the lens assembly output corresponding to the entire input field-of-view of the detector assembly under test in the focal plane.

2. The assembly of claim 1 wherein said lens groups are infrared transmissive.

3. The assembly of claim 1 wherein said first lens group includes three lens elements.

4. The assembly of claim 3 wherein said first lens group includes a first lens element with an aspheric front surface and a convex back surface.

5. The assembly of claim 3 wherein said first lens group includes a second lens element with a convex front surface and a concave back surface.

6. The assembly of claim 3 wherein said first lens group includes a third lens element with a concave front surface and a convex back surface.

7. The assembly of claim 1 wherein said second lens group includes four lens elements.

8. The assembly of claim 7 wherein said second lens group includes a fourth lens element with an aspheric front surface and a convex back surface.

9. The assembly of claim 7 wherein said second lens group includes a fifth lens element with a convex front surface and a concave back surface.

10. The assembly of claim 7 wherein said second lens group includes a sixth lens element with a convex front surface and a concave back surface.

11. The assembly of claim 7 wherein said second lens group includes a seventh lens element with a convex front surface and an aspheric back surface.

* * * * *